United States Patent [19]

Muramatsu et al.

[11] Patent Number: 5,787,852
[45] Date of Patent: Aug. 4, 1998

[54] INTAKE SYSTEM FOR AN INTERNAL COMBUSTION ENGINE

[75] Inventors: Hiroaki Muramatsu, Toyota; Isao Matsumoto, Susono, both of Japan

[73] Assignee: Toyota Jidosha Kabushiki Kaisha, Toyota, Japan

[21] Appl. No.: 873,187

[22] Filed: Jun. 11, 1997

[30] Foreign Application Priority Data

Jun. 14, 1996 [JP] Japan ................................ 8-154192
Feb. 18, 1997 [JP] Japan ................................ 9-033835

[51] Int. Cl.⁶ ........................................ F02B 27/02
[52] U.S. Cl. .............................. 123/184.55; 123/184.56
[58] Field of Search ................. 123/184.55, 184.56, 123/184.53

[56] References Cited

U.S. PATENT DOCUMENTS

| | | | |
|---|---|---|---|
| 2,835,235 | 5/1958 | Gassmann | 123/184.55 |
| 4,538,556 | 9/1985 | Takeda . | |
| 4,590,895 | 5/1986 | Yada et al. | 123/184.55 |
| 4,619,226 | 10/1986 | Ueda et al. . | |
| 4,646,689 | 3/1987 | Katsumoto et al. . | |
| 4,765,286 | 8/1988 | Lyjak et al. . | |
| 5,687,684 | 11/1997 | Verkleeren | 123/184.55 |

FOREIGN PATENT DOCUMENTS 62-214223 9/1987 Japan .
63-96230 6/1988 Japan .

*Primary Examiner*—Marguerite McMahon
*Attorney, Agent, or Firm*—Oliff & Berridge, PLC

[57] ABSTRACT

An intake system for an internal combustion engine is disclosed. The intake system comprises a cylindrical member, a first intake passage portion which extends axially within the cylindrical member, two side walls which extend circumferentially on the outer side of the cylindrical wall of the cylindrical member and which are spaced apart from each other in the axial direction of the cylindrical member, a second intake passage portion downstream of the first intake passage portion which is formed between two side surfaces, facing each other, of the two side wall, and an opening formed on the cylindrical wall of the cylindrical member to communicate the first intake passage with the second intake passage. The cylindrical member with the opening is turned to vary the effective length of the second intake passage portion. A distance between the two side surfaces of the two side walls varies such that the longer the effective length of the second intake passage portion becomes by the turning motion of the cylindrical member, the shorter the distance becomes.

6 Claims, 8 Drawing Sheets

INTAKE SYSTEM FOR AN INTERNAL COMBUSTION ENGINE

BACKGROUND OF THE INVENTION

1. Field of the Invention

The present invention relates to an intake system for an internal combustion engine.

2. Description of the Related Art

When a length and a sectional area of an intake passage portion downstream of the surge tank are suitably selected, an inertia charge is realized at a predetermined engine speed so that a charging efficiency of intake air increases and thus an output of the engine can increase. To realize such an inertia charge at each engine speed, it is proposed to vary an effective length of the intake passage portion. For example, Japanese Unexamined Utility Model Patent Publication No. 63-96230 discloses an intake system comprising a cylindrical housing and a cylindrical surge tank arranged concentrically within the housing, in which a C-shape space between the housing and the surge tank is used as the intake passage portion.

In the intake system, intake air flows out from an opening formed on the circumferential wall of the surge tank and flows circumferentially in the C-shape space, i.e., in the intake passage portion. Therefore, once the surge tank with the opening is turned around the axis thereof, an effective length of the intake passage portion varies continuously and thus an inertia charge can be realized over the range between a low engine speed and a high engine speed.

According to the intake system, an inertia charge can be realized over a relatively large engine speed range. However, an inertia charge cannot be realized in a very low engine speed. To realize this, the intake passage portion must be made very long. This means that a diameter of the surge tank becomes very large or that an axial length of the surge tank becomes very long to use two side by side C-shape spaces as one intake passage portion. In each case, the intake system becomes very large and thus it cannot be installed in a vehicle.

Japanese Unexamined Patent Publication 62-214223 discloses an intake system in which the cylindrical surge tank is arranged eccentrically within the cylindrical housing. Accordingly, in the C-shape space used as the intake passage portion, a sectional area at the most upstream position is small and a sectional area at the most downstream position is large and a sectional area therebetween gradually varies.

Therefore, in the intake system, the longer the effective length of intake passage portion becomes by turning of the surge tank, the smaller a sectional area close to the opening of the surge tank in the intake passage portion can become.

If the effective length of the intake passage portion is made long and at the same time, the sectional area of the intake passage portion is uniformly made small, an inertia charge can be realized in a very low engine speed without the very long intake passage portion, i.e., the very large surge tank. However, in the above-mentioned intake system, when the effective length of the intake passage portion is made long, the sectional area close to the opening of the surge tank in the intake passage portion is only made small. Thus, even if the intake passage portion is partly narrowed down without the very long intake passage, an inertia charge can be realized at a very low engine speed.

SUMMARY OF THE INVENTION

Therefore, an object of the present invention is to provide an intake system, for an internal combustion engine, which can realize an inertia charge between a very low engine speed and high engine speed without the very long intake passage portion involving a large intake system.

According to the present invention, there is provided an intake system for an internal combustion engine comprising: a cylindrical member; a first intake passage portion which extends axially within the cylindrical member; two side walls which extend circumferentially on the outer side of the cylindrical wall of the cylindrical member and which are spaced apart from each other in the axial direction of the cylindrical member; a second intake passage portion downstream of the first intake passage portion which is formed between two side surfaces, facing each other, of the two side walls; an opening formed on the cylindrical wall of the cylindrical member to communicate the first intake passage with the second intake passage; turning means for turning the cylindrical member with the opening to vary the effective length of the second intake passage portion; and a varying means for varying a distance between the two side surfaces of the two side walls such that the longer the effective length of the second intake passage portion becomes by the turning motion of the cylindrical member, the shorter the distance becomes.

The present invention will be more fully understood from the description of preferred embodiments of the invention set forth below, together with the accompanying drawings.

DESCRIPTION OF THE PREFERRED EMBODIMENTS

Figure 1:
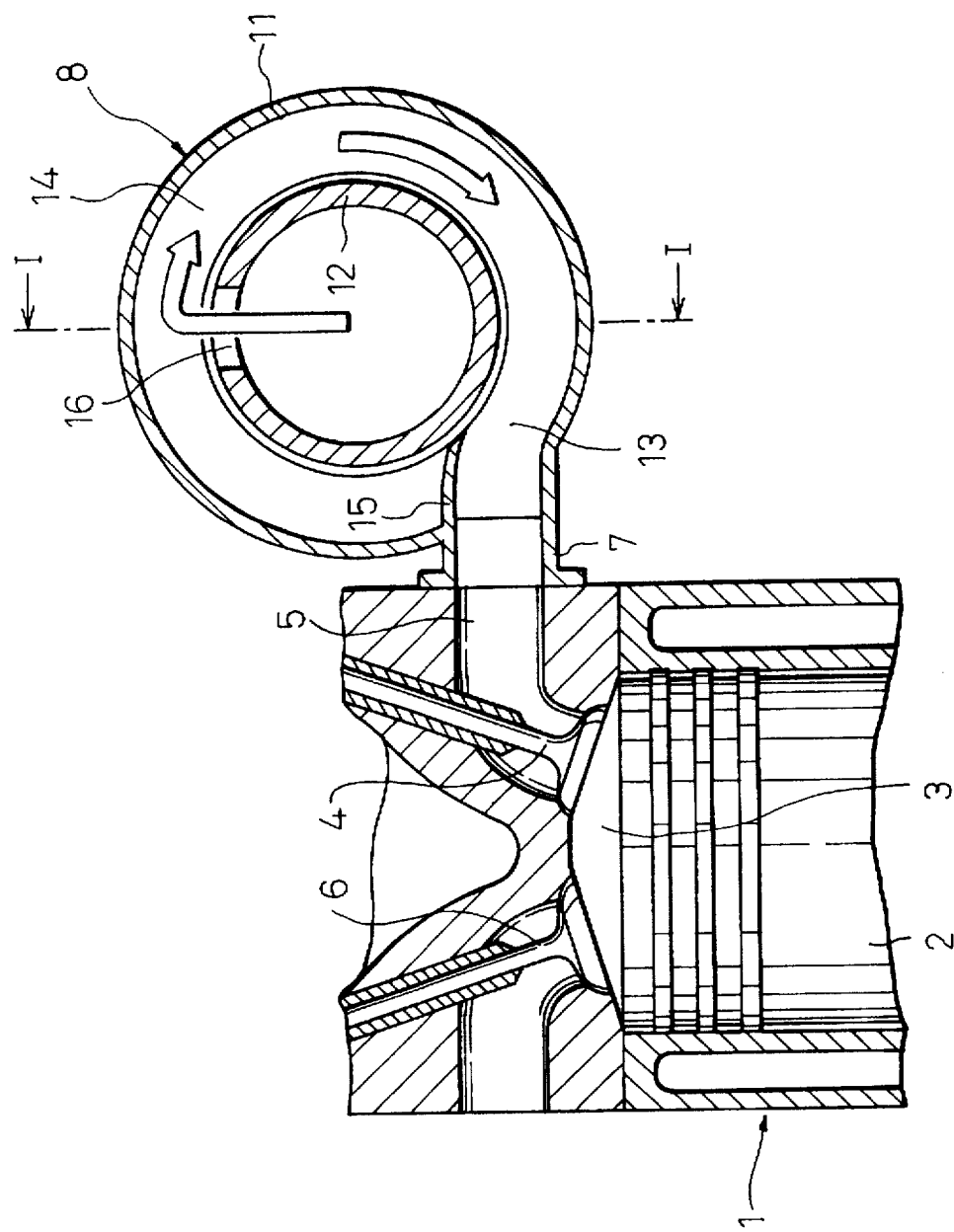
FIG. 1 is a sectional view of an intake system for a first embodiment according to the present invention.
Figure 2:
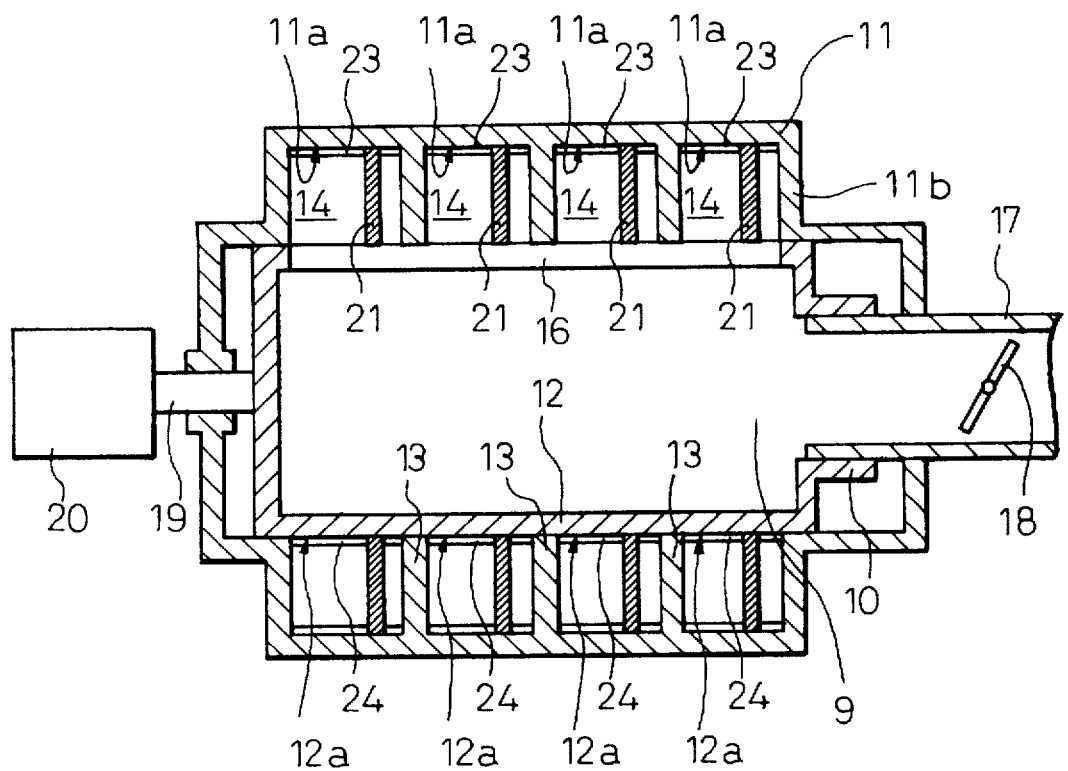
FIG. 2 is an I—I sectional view of FIG. 1.

FIG. 1 is a sectional view of an intake system for a first embodiment according to the present invention. Referring to FIG. 1, reference numeral 1 designates a 4-cylinder internal combustion engine. Reference numeral 2 designates a piston. Reference numeral 3 designates a combustion chamber. Reference numeral 4 designates an intake valve. Reference numeral 5 designates an intake port. Reference numeral 6 designates an exhaust valve. Reference numeral 7 designates a connecting pipe. Reference numeral 8 designates a device for varying the effective length of intake passage portion. FIG. 2 is an I—I sectional view of FIG. 1 and shows a sectional view of the device 8. Referring to FIGS. 1 and 2, the device 8 comprises a stable cylindrical housing 11 and a cylindrical member 12 arranged concentrically within the housing 11. A space between the housing 11 and cylindrical member 12 is divided axially into four C-shape spaces by three C-shape partitions 13. Each C-shape space is closed by an end wall 15 on one end, and communicates with the combustion chamber 3 via the connecting pipe 7 on the other end.

The cylindrical member 12 has an elongate opening 16 which opens into all of the four C-shape spaces. Instead of the opening 16, four openings may be formed on the cylindrical member 12, each which opens to one of the four C-shape spaces. The cylindrical member 12 is closed on one end and is connected to the intake pipe 17 by the connection portion 10 which extends axially at the other end. A throttle valve 18 is arranged within the intake pipe 17.

In the device 8, a space 9 within the cylindrical member 12 is a first intake passage portion 9 of the general intake passage, which extends axially within the cylindrical member 12 and serves as a surge tank. In each C-shape space, a moveable side wall 21 is arranged. Each space which is positioned to the left of the moveable side wall 21 in FIG. 2, is a second intake passage portion 14 of the general intake passage, which extends circumferentially and is downstream of the surge tank, i.e., an expanding portion of the general intake passage. The first intake passage portion 9 communicates with the second intake passage portion 14 through the opening 16. Therefore, intake air flows into the first intake passage portion 9 from the intake pipe 17 via the throttle valve 18, flows into the second intake passage portion 14 via the opening 16, and flows into the combustion chamber 3 via the connecting pipe 7 and the intake port 5.

The cylindrical member 12 is connected to an actuator 20 via a shaft 19, on the closed end. The cylindrical member 12 can be turned around the axis thereof by the actuator 20 in relation to the stable housing 11 and the intake pipe 17. A turning seal construction is provided between the connecting portion 10 of the cylindrical member 12 and the intake pipe 17.

Figure 3:
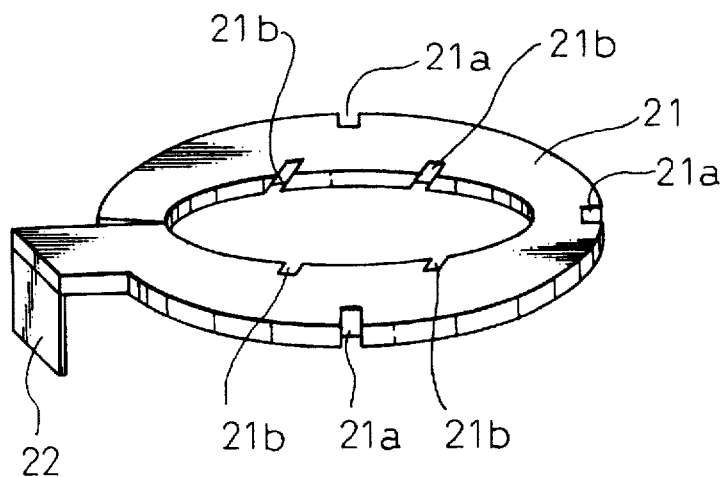
FIG. 3 is a perspective view of the movable side wall.

FIG. 3 shows the moveable side wall 21 arranged in the C-shape space. Three first notches 21a are formed on the outer circumference of the movable side wall 21 at suitable angles. Each first notch 21a engages with a guide 23 arranged on the inner surface 11a of the housing 11 in the C-shape space. Each guide 23 extends in the axial direction of the cylindrical member 12.

On the other hand, four second notches 21b are formed on the inner circumference of the movable side wall 21 and are separated by equal angles. Each second notch 21b engages with a spline 24 arranged on the outer surface 12a of the cylindrical member 12 in the C-shape space. Each spline 24 extends helically in relation to the axis of the cylindrical member 12. The configuration of each second notch 21b matches such a spline 24. Each spline 24 is arranged not so as to cross the opening 16.

On the connecting pipe 7 side end of the movable side wall 21, one end of a membrane 22 which has a width equal to the width of the movable side wall 21 is fixed. The other end of the membrane 22 is fixed on the partition 13 or the side wall 11b of the housing 11 which is positioned to the right of the corresponding movable side wall 21 in FIG. 2. A space which is positioned to the right of the movable side wall 21 in the C-shape space is closed by the membrane 22 so that intake air does not flow therein. The membrane 22 is made from any flexible material, for example rubber or the like. Therefore, the membrane 21 is easily deformed to a U-shape when the both ends thereof are brought close each other by the movable side wall 21 moving. Thus, the membrane 21 always interrupts the intake air flow.

When a length and sectional area of the intake passage portion downstream of surge tank, i.e., an expanding portion in the general intake passage are selected suitably, an inertia charge is realized at a predetermined engine speed so that a charging efficiency of intake air can be increased. The predetermined engine speed [N] is calculated by the follow expression (1).

$$N = 30C(S/L * Vh)^{1/2}/2\pi \tag{1}$$

Here, [C] is the speed of sound, [S] is a sectional area of the intake passage portion, [L] is a length of the intake passage portion, and [Vh] is the stroke capacity of the engine.

The device 8 for varying the effective length of the intake passage portion of the present embodiment is controlled on the basis of a current engine speed detected by an engine speed sensor. Namely, the lower the engine speed is, the more the cylindrical member 12 is turned counter-clockwise in FIG. 1. On the other hand, the higher the engine speed is, the more the cylindrical member 12 is turned clockwise in FIG. 1. Therefore, the lower the engine speed is, the further the opening 16 of the cylindrical member 12 is separated from the connecting pipe 7, i.e., the longer an effective length [L] of the intake passage portion becomes.

The movable side wall 21 is movable in the axial direction of the cylindrical member 12 and cannot turn due to the guides 23 arranged on the housing 11. Therefore, the movable side wall 21 moves gradually left in FIG. 2 when the cylindrical member 12 with the splines 24 is turned counter-clockwise. Thus, the lower the engine speed is, the smaller the sectional area of the second intake passage portion 14 uniformly becomes.

Namely, in the device 8 of the present embodiment, when the engine speed is low, the effective length of the second intake passage portion 14 is made long and at the same time, the sectional area thereof is made uniformly small. Thus, in comparison with the prior device which varies only the effective length of the intake passage portion, if the device 8 of the present embodiment has the same size surge tank, the device 8 can realize an inertia charge in a wide engine speed range as seen in the above mentioned expression (1). Thus, the device 8 can also realize an inertia charge at very low engine speed.

Here, as seen in the expression (1), combinations of the length [L] and the sectional area [S] of the intake passage portion to realize an inertia charge at a certain engine speed are legion. A charging efficiency varies with the selected sectional area [S] because a passage resistance in the intake passage portion varies with the sectional area [S]. If the sectional area [S] is made very small to realize an inertia charge in a certain engine speed, the length [L] of the intake passage portion becomes very short. Therefore, though a flow speed of intake air becomes high, a passage resistance is large and thus a charging efficiency does not becomes very high.

On the other hand, if the sectional area [S] is made very large to realize an inertia charge at the certain engine speed, the effective length [L] of the intake passage portion becomes very long. Therefore, a flow speed of intake air becomes low so that a charging efficiency does not becomes very high.

Figure 4:
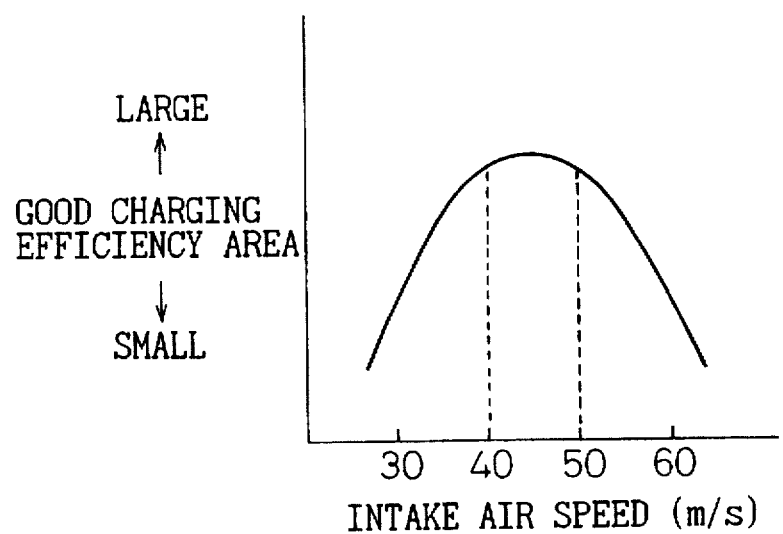
FIG. 4 is a graph showing a relationship between the intake air speed and the good charging efficiency area.

FIG. 4 is a graph showing a relationship between the flow speed of intake air and the good charging efficiency area at a predetermined engine speed. The good charging efficiency area means an area over the predetermined charging efficiency in a graph of relationship between the charging efficiency and the engine speed on the basis of any combination of the sectional area [S] and the length [L] of the intake passage portion to realize an inertia charge at a certain engine speed. Namely, the good charging efficiency area corresponds an effect of the selected combination of the sectional area [S] and the length [L] of the intake passage portion. Once the good charging efficiency areas of the selected combinations of the sectional area [S] and the length [L] of the intake passage portion are regulated on the basis of the flow speeds of intake air, the graph in FIG. 4 can be obtained. As seen from the graph, when the flow speed of intake air is made 40 to 50 m/s, the good charging efficiency area become large. The flow speed of intake air is subjected to the influence of the sectional area of the intake passage portion. Accordingly, to realize an inertia charge, a sectional area [S] of the intake passage portion is selected such that a flow speed of intake air becomes 40 to 50 m/s and a length [L] of the intake passage portion is selected on the basis of the selected sectional area [S], a high charging efficiency can be obtained. It is known that a flow speed at 40 to 50 m/s of the intake air causes a high charging efficiency at each engine speed.

In the present embodiment, a position of the movable side wall 21 is controlled by the splines 24 such that a sectional area [S] by which the flow speed of intake air becomes 40 to 50 m/s can be always realized in each engine speed and an effective length [L] by which an inertia charge can be caused on the basis of the sectional area [S] can be realized in each engine speed.

In the present embodiment, the second intake passage portions 14 are arranged to be close each other. The connecting pipes 7 allow the second intake passage portions 14 which are close each other to connect to the intake ports 5 which are spaced away from each other. Although the intake port 5 and the connecting pipe 7 are positioned downstream of the surge tank, a sectional area therein cannot be varied. However, a total length of the intake port 5 and the connecting pipe 7 is very short in comparison with the length of the second intake passage portion 14 so that an inertia charge can be realized at each engine speed without a large influence on the intake port 5 and the connecting pipe 7.

Figure 5:
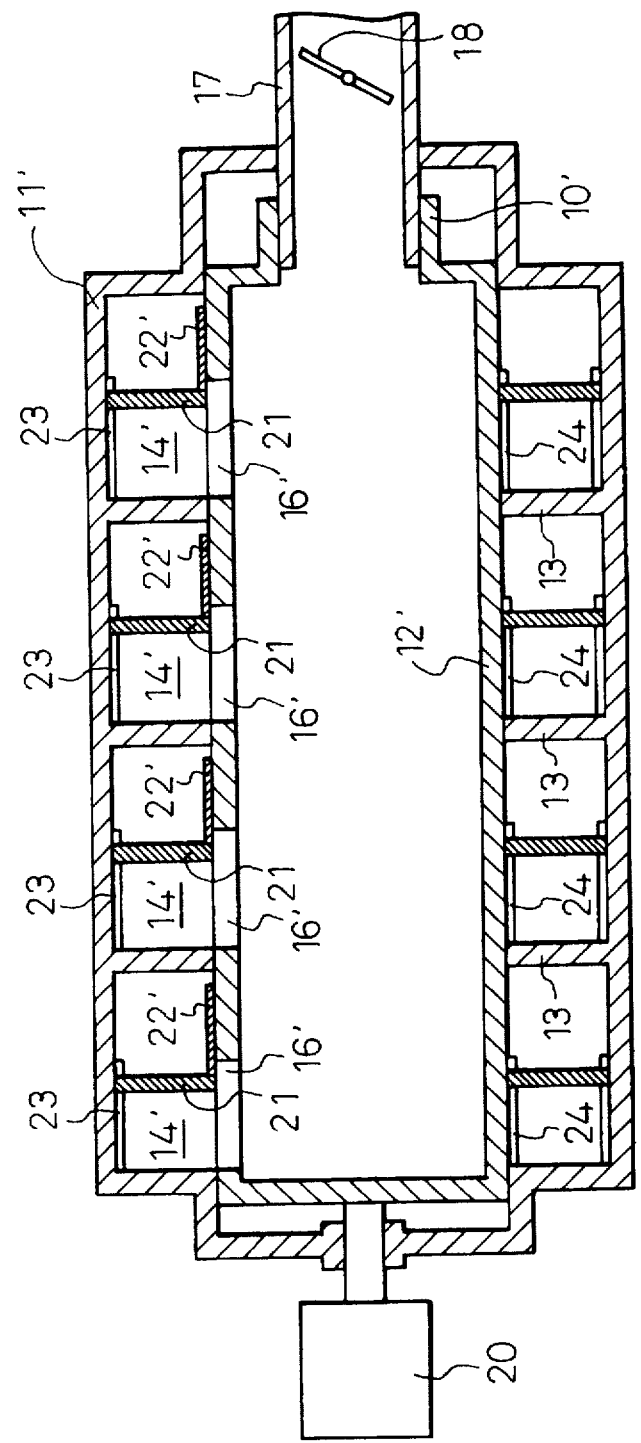
FIG. 5 is a view corresponding the A—A sectional view of FIG. 1 in the modification of the first embodiment.

For example, as shown in FIG. 5, if the cylindrical member 12' is extended axially and the second intake passage portions 14' are spaced apart from each other so as to correspond the intake ports which are spaced apart from each other, the second intake passage 14' can be directly connected to the intake port without the connecting pipe 7. Although a sectional area of the intake port 7 cannot still be varied, a length of the intake port 5 is very much shorter in comparison with the length of the second intake passage portion 14 so that the above-mentioned influence can be reduced. In such an construction, the opening 16' of the cylindrical member 12' is formed at every second intake passage portion 14'. The second intake passage portions 14' are spaced apart from each other and there is a dead space between two second intake passages 14'. By use of the dead space, a shutter plate 22' which shuts the opening 16' at the right side of the movable side wall 21 can be mounted to the movable side wall 21. Thereby, the above-mentioned membrane 22 can be omitted.

If the upstream portion of the intake port 5 has the same rectangular section as the second intake passage portion 14', the movable side wall 21 is extended downstream and the extension portion of the movable side wall 21 can be inserted into the intake port 5. Therefore, a sectional area of the upstream portion of the intake port 5 can be also varied so that the above-mentioned influence can be reduced still more.

Figure 6:
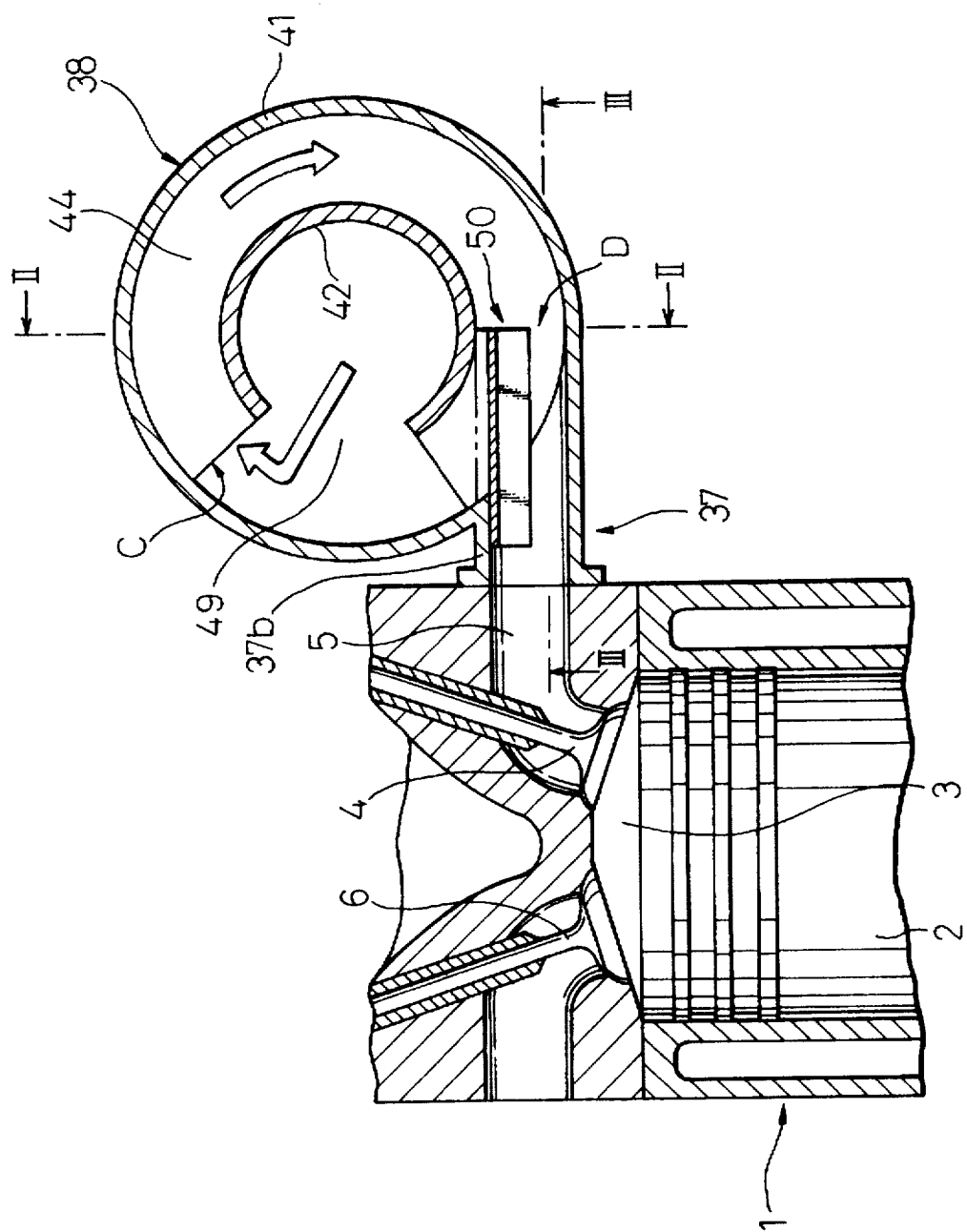
FIG. 6 is a sectional view of an intake system for a second embodiment according to the present invention.
Figure 7:
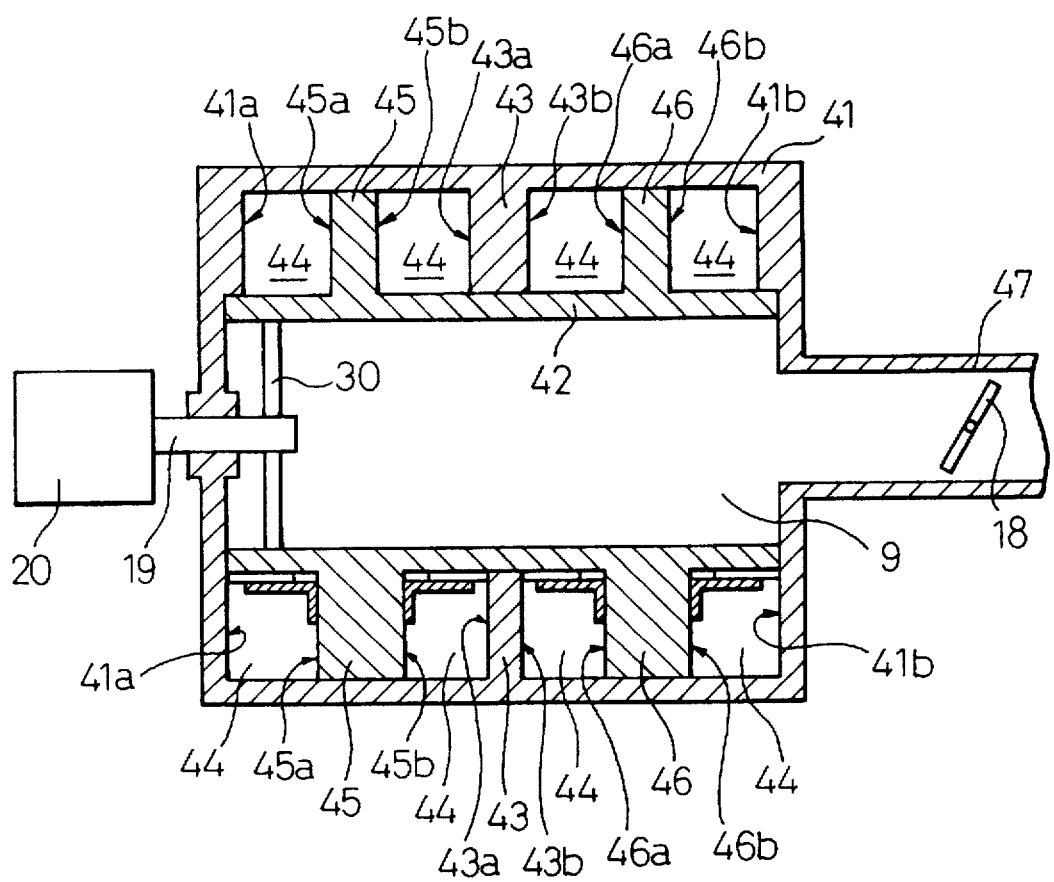
FIG. 7 is a II—II sectional view of FIG. 6.

FIG. 6 is a sectional view of an intake system for a second embodiment according to the present invention. FIG. 7 is a II—II sectional view of FIG. 6 and shows a sectional view of a device 38 for varying the effective length of an intake passage portion. Referring to FIGS. 6 and 7, the same members as the first embodiment are designated by the same reference numerals. The differences between the first and second embodiments are explained as follows. The device 38 of the present embodiment comprises a stable cylindrical housing 41 and a cylindrical member 42 arranged concentrically within the housing 41. The cylindrical member 42 is connected to the shaft 19 of the actuator 20 via connecting members 30 which extend radially. Thus, the cylindrical member 42 can be turned around the axis thereof by the actuator 20 in relation to the stable housing 41. An intake pipe 47 in which the throttle valve 18 is arranged is almost concentrically connected to the housing 41 on the opposite side of the actuator 20.

The cylindrical member 42 is partly cut out axially so that an opening 49 is formed in the cylindrical member 42. First and second partition walls 45, 46, which extend circumferentially, are spaced apart from each other and are connected on an outer side of the cylindrical member 42. Between the first and second partition walls, a third partition wall 43, which extends circumferentially, is connected on an inner side of the housing 41. In FIG. 7, an actuator side second intake passage portion 44 which is positioned very close to the actuator 20 is formed between the left side surface 45a of the first partition wall 45 and the left inside surface 41a of the housing 41. Similarly, a second intake passage portion 44 is formed between the right side surface 45b of the first partition wall 45 and the left side surface 43a of the third partition wall 43. A second intake passage portion 44 is formed between the right side surface 43b of the third partition wall 43 and the left side surface 46a of the second partition wall 46. A second intake passage portion 44 is formed between the right side surface 46b of the second partition wall 46 and the right inside surface 41b of the housing 41. The left inside surface 41a of the housing 41 is formed helically in relation to the axis of the cylindrical member 42. The left side surface 45a of the first partition wall 45 is formed helically and almost parallel to the left inside surface 41a.

FIGS. 6 and 7 show the device 38 at a very low engine speed. In this condition, the helical shapes of the left inside surface 41a of the housing 41 and the left side surface 45a of the first partition wall 45 are explained. On the most upstream end position [C], the left inside surface 41a of the housing 41 is positioned axially very close to the throttle valve 18. On the circumference connecting position [D] of the connecting member 37, the left inside surface 41a is positioned axially very close to the actuator 20. From the position [C] to the position [D], the left inside surface 41a gradually moves. From the position [D] to the position [C], the left inside surface 41a is kept very close to the actuator 20. A step is formed at the most upstream end portion [C]. On the other hand, the left side surface 45a of the first partition wall 45 is almost parallel to the left inside surface 41a of the housing 41 from the position [C] to the position [D]. From the position [D] to the position [C], the left side surface 45a gradually varies so as to be close to the actuator 20.

The right side surface 45b and the left side surface 45a of the first partition wall 45 are symmetrical about a vertical plane of the axis of the cylindrical member 42. The left side surface 43a of the third partition wall 43 and the left inside surface 41a of the housing 41 are symmetrical about the vertical plane of the axis of the cylindrical member 42. The right side surface 43b and the left side surface 43a of the third partition wall 43 are symmetrical about a vertical plane of the axis of the cylindrical member 42. The left side surface 46a of the second partition wall 46 and the right side surface 45b of the first partition wall 45 are symmetrical about the vertical plane of the axis of the cylindrical member 42. The right side surface 46b of the second partition wall 46 and the left side surface 45a of the first partition wall 45 are symmetrical about the vertical plane of the axis of the cylindrical member 42. The right inside surface 41b and the left inside surface 41a of the housing 41 are symmetrical about the vertical plane of the axis of the cylindrical member 42.

In the device 38 for varying the effective length of intake passage portion, the higher the engine speed becomes, the more the cylindrical member 42 is turned clockwise in FIG. 6. Therefore, the higher the engine speed becomes, the closer the opening 49 of the cylindrical member 42 is to the connecting member 37. Namely, the higher the engine speed becomes, the shorter the effective length of the second intake passage portion 44 becomes.

Once the cylindrical member 42 is turned, the distance between the helical left inside surface 41a of the housing 41 and the helical left side surface 45a of the first partition wall 45 varies. The distance is narrowest at a very low engine speed as shown in FIGS. 6 and 7. The higher the engine speed becomes, the wider the distance becomes. The distances in the other second intake passage portions 44 vary similarly. Thus, the higher the engine speed is, the larger the sectional area of the second intake passage portion 44 uniformly becomes.

Namely, in the device 38 of the present embodiment, when the engine speed is low, the effective length of the second intake passage portion 14 is made long and at the same time, the sectional area thereof is made uniformly small. Thus, in comparison with the prior device which varies only the effective length of the intake passage portion, if the device 38 of the present embodiment has the same size surge tank, the device 38 can realize an inertia charge in a wide engine speed range and can also realize an inertia charge at a very low engine speed.

In the present embodiment, two surfaces of the second intake passage portion 44 are almost parallel each other. However, this does not limit to the present invention. If these two surfaces are helical so as to incline at the same rule, the surfaces need not be parallel to each other.

In the present embodiment, to realize such an inertia charge, intake air must be prevented from passing through a space between the housing 41 and the cylindrical member 42 in the counter-clockwise direction in FIG. 6. A construction for the purpose is explained as follows.

Figure 8:
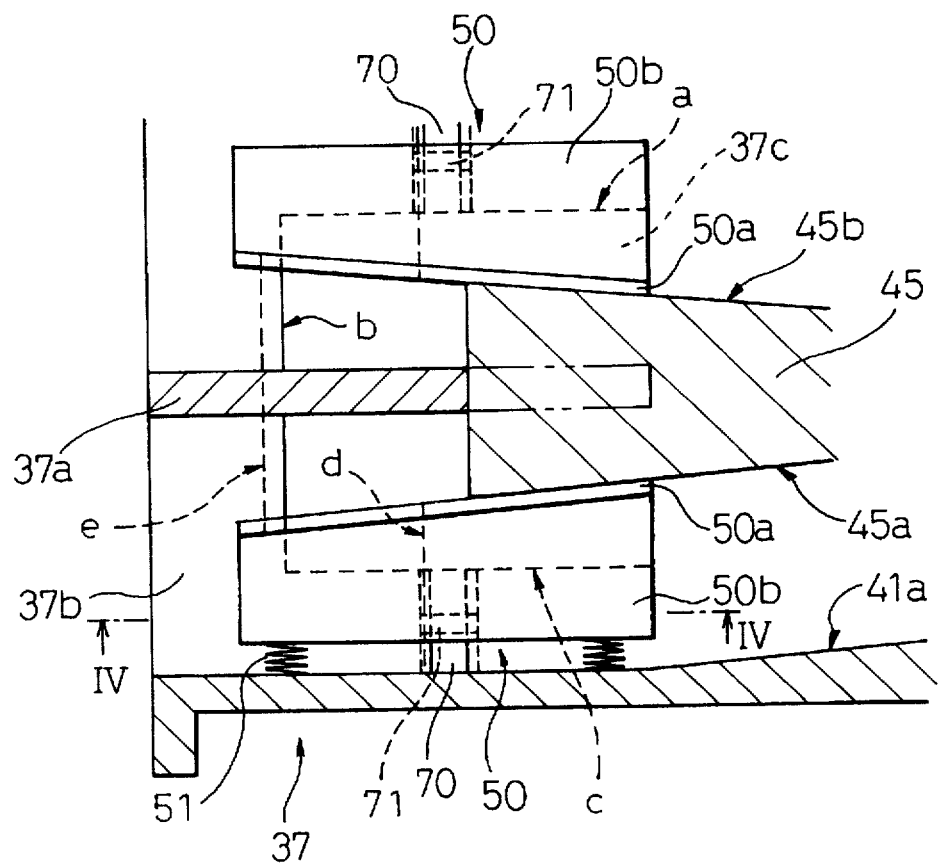
FIG. 8 is a III—III sectional enlarged view of FIG. 6.
Figure 9:
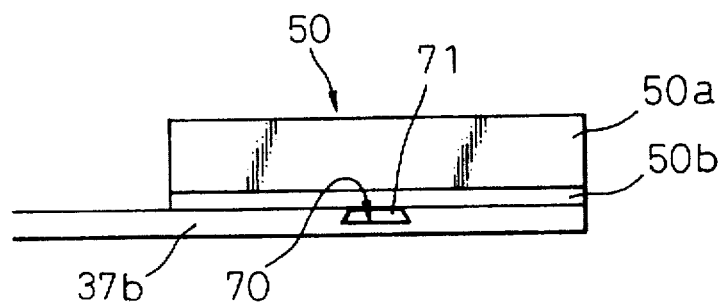
FIG. 9 is a IV—IV sectional view of FIG. 8.

FIG. 8 shows a III—III sectional enlarged view of FIG. 6. FIG. 9 shows a IV—IV sectional view of FIG. 8. The connecting member 37 connects the device 38 with the intake ports 5. The connecting member 37 has a rectangular section and is integral for all of the intake ports 5. A space with the connecting member 37 is divided into four spaces by two partition walls which contact with the first and second partition walls 45, 46 of the cylindrical member 42, respectively (only one, which contacts with the first partition wall 45, is designated by reference numeral 37a) and a partition wall which is connected to the third partition wall 43 of the housing 41 (not shown). The two partition walls which contact with the first and second partition walls 45, 46 of the cylindrical member 42 have a circular arc end surface which has the same radius as the first and second partition walls 45, 46, to slide on the first and second partition walls 45, 46, respectively.

The upper wall 37b of the connecting member 37 extends to the circumference connecting position [D] of the second intake passage portion 44 within the housing 41, and has notches 37c to allow the first and second partition walls 45, 46 to turn. To prevent the above-mentioned intake air passing, gaps between the notches 37c and the partition walls 45, 46 must be shut. Only one notch 37c is designated by dot lines [a], [b], [c]. A dot line [d] shows the end surface of the opening 49 of cylindrical member 42. A dot line [e] shows the end surface of the first partition wall 45.

Four shutting member 50 are arranged to shut the gaps. The shutting member 50 comprises a vertical wall 50a which bears against each side surface 45a, 45b, 46a, 46b of the first and second partition walls 45, 46, and a horizontal wall 50b which bears against the upper wall 37b of the connecting member 37. The gaps are shut by the horizontal walls 50b. The shutting member 50 is pressed by, for example, springs 51 toward each side surface 45a, 45b, 46a, 46b of the first and second partition walls 45, 46. Therefore, although the axial position in the notch 37c of each side surface 45a, 45b, 46a, 46b is varied by the turning of the cylindrical member 42 with the first and second partition walls 45, 46 and the width of the gaps varies, each shutting member 50 follows the axial position varying of each side surface 45a, 45b, 46a, 46b and thus the gaps can be always shut by the shutting members 50. To make the shutting member 50 always contact with the upper wall 37b of the connecting member 37 and to allow the shutting member 50 move in the axial direction of the housing 41, a groove 70, which has a trapezoidal section and extends in the axial direction of the housing 41, is formed on the upper wall 37b of the connecting member 37, and the horizontal wall 50b of the shutting member 50 has an engaging portion 71 which has a trapezoidal section and engages with the groove 70. Thus, a guide mechanism is constructed by the groove 70 and the engaging portion 71.

FIG. 8 is in case that the effective length of the second intake passage portion is the longest and the sectional area thereof is the smallest. Each side surface of the first and second partition walls 45, 46 is very close to corresponding surface of the stable housing 41 and the third partition wall 43. Therefore, the springs 51 are in the most compressed condition.

To make the shutting members always contact each side surface of the first and second partition walls, instead of the above-mentioned biasing means as the spring 51, a groove and an engaging member may be used. One example of such a groove and an engaging member is explained as follows.

Figure 10:
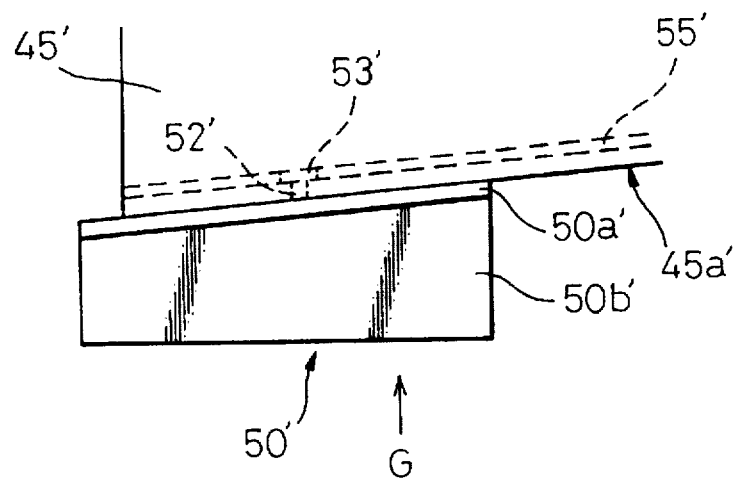
FIG. 10 is a view corresponding to a part of FIG. 8 to explain another construction for contacting the shutting member with the side surface of the partition wall.
Figure 11:
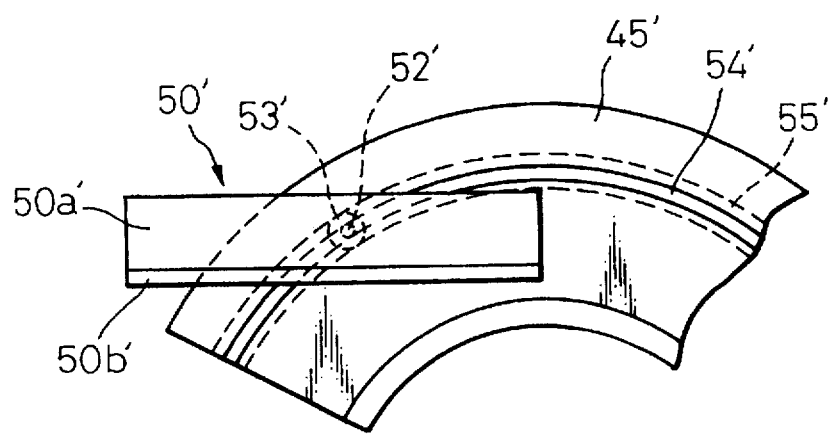
FIG. 11 is a view in the direction of the arrow G.

FIG. 10 is a view corresponding a part of FIG. 8. FIG. 11 is a view in the direction of arrow G in FIG. 10. In these figures, members other than the shutting member 50' and the first partition wall 45' are omitted to make the figures easier to understand. A shaft 52' is fixed on the center portion of the sliding surface of the vertical wall 50a' of the shutting member 50'. The shaft 52' is almost vertical to the sliding surface of the vertical wall 50a'. On the end of the shaft 52', a disk 53' which has a diameter larger than that of the shaft 52', and extends parallel to the sliding surface of the vertical wall 50a', is fixed.

On the other hand, an outer groove 54' for receiving the shaft 52' is formed on the sliding surface, i.e., the side surface 45a' of the first partition wall 45'. An inner groove 55' for receiving the disk 53' is formed within the first partition wall 45'. The outer groove 54' and the inner groove 55' are communicated each other. The width of outer groove 54' is slightly larger than the diameter of the shaft 52'. The width of inner groove 55' is slightly larger than the diameter of the disk 53'. The outer and inner grooves 54', 55'0 are formed concentrically against the cylindrical member 42.

The above mentioned guide mechanism (the trapezoidal groove and engaging member) is formed between the horizontal wall 50b' of the shutting member 50' and the upper wall 37b of the connecting member 37. The shutting member 50' is connected to the first partition wall 45' by engaging the disk 53' with the inner groove 55'. Therefore, the horizontal wall 50b' of the shutting member 50' always contacts the upper wall 37b of the connecting member 37, and the vertical wall 50a' of the shutting member 50' follows the varying axial position of the side surface of the first partition wall 45', and thus the gap can be always shut by the shutting members 50.

To improve airtightness, a seal member may be arranged between the upper wall of the connecting member and the cylindrical member, or between the partition walls of the connecting member and the first and second partition walls, or between the horizontal wall of the shutting member and the upper wall of the connecting member, or the like. In the first and second embodiments, the second intake passage portions extend above the intake ports. Of course, the second intake passage portions may extend below the intake ports. Therefore, the height from the bottom of the engine to the top of the intake system can become small so that the engine with the intake system can be easily installed in a vehicle.

Although the invention has been described with reference to specific embodiments thereof, it should be apparent that numerous modifications can be made thereto, by those skilled in the art, without departing from the basic concept and scope of the invention.

We claim:

1. An intake system for an internal combustion engine, comprising:

a cylindrical member;

a first intake passage portion which extends axially within said cylindrical member;

two side walls which extend circumferentially on the outer side of the cylindrical wall of said cylindrical member and which are spaced apart from each other in the axial direction of said cylindrical member;

a second intake passage portion downstream of said first intake passage portion which is formed between two side surfaces, facing each other, of said two side walls;

an opening formed on said cylindrical wall of said cylindrical member to communicate said first intake passage with said second intake passage;

turning means for turning said cylindrical member with said opening to vary the effective length of said second intake passage portion; and a varying means for varying a distance between said two side surfaces of said two side walls such that the longer said effective length of said second intake passage portion becomes by said turning motion of said cylindrical member, the shorter said distance becomes.

2. An intake system according to claim 1, wherein at least one of said two side wall is movable only in the axial direction of said cylindrical member and said varying means converts said turning motion of said cylindrical member into a moving motion of said one side wall to vary said distance.

3. An intake system according to claim 2, wherein said varying means comprises a helical spline, in relation to the axis of said cylindrical member, arranged on one of said one side wall and said cylindrical member and a groove with which said helical spline engages, arranged on the other of said one side wall and said cylindrical member.

4. An intake system according to claim 3, wherein said helical spline is arranged on said cylindrical member, said groove is arranged on said one side wall.

5. An intake system according to claim 1, wherein said two side surfaces are helical in relation to said axis of said cylindrical member and said varying means links one of said two side walls to said cylindrical member to vary said distance.

6. An intake system according to claim 5, wherein said two side surfaces are parallel to each other.

* * * * *